(12) United States Patent  (10) Patent No.: US 9,098,340 B2
Brown et al. (45) Date of Patent: Aug. 4, 2015

(54) VIRTUAL REGULATOR FOR A DATABASE SYSTEM

(75) Inventors: Douglas Brown, Santa Fe, CA (US); Debra Galeazzi, LaQuinta, CA (US); Kenneth Shortes, San Diego, CA (US); Walton Dutton, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 525 days.

(21) Appl. No.: 11/468,924

(22) Filed: Aug. 31, 2006

(65) Prior Publication Data

US 2007/0078843 A1 Apr. 5, 2007

Related U.S. Application Data

(60) Provisional application No. 60/715,816, filed on Sep. 9, 2005.

(51) Int. Cl.
*G06F 17/30* (2006.01)
*G06F 9/50* (2006.01)
*G06F 17/00* (2006.01)

(52) U.S. Cl.
CPC .......... *G06F 9/505* (2013.01); *G06F 17/30289* (2013.01); *G06F 17/30312* (2013.01); *G06F 17/30424* (2013.01)

(58) Field of Classification Search
CPC .................. G06F 17/30289; G06F 17/30424
USPC .............................................. 707/4, 757, 770
See application file for complete search history.

(56) References Cited

U.S. PATENT DOCUMENTS

| 5,473,773 | A | | 12/1995 | Aman et al. |
| 5,504,894 | A | * | 4/1996 | Ferguson et al. ................. 707/2 |
| 5,537,542 | A | | 7/1996 | Eilert et al. |
| 5,872,963 | A | * | 2/1999 | Bitar et al. ..................... 712/233 |
| 5,943,666 | A | * | 8/1999 | Kleewein et al. ..................... 1/1 |
| 6,223,201 | B1 | * | 4/2001 | Reznak ......................... 718/102 |
| 6,351,749 | B1 | * | 2/2002 | Brown et al. ................... 707/10 |
| 6,718,358 | B1 | | 4/2004 | Bigus et al. |
| 6,760,684 | B1 | * | 7/2004 | Yang et al. .................... 702/182 |
| 6,826,753 | B1 | | 11/2004 | Dageville et al. |
| 6,950,848 | B1 | | 9/2005 | Yousefizadeh |
| 7,146,353 | B2 | | 12/2006 | Garg et al. |
| 7,228,546 | B1 | | 6/2007 | McCarthy et al. |
| 7,234,139 | B1 | * | 6/2007 | Feinberg ........................... 718/1 |
| 7,565,652 | B2 | * | 7/2009 | Janssen et al. ................ 718/103 |
| 2003/0005028 | A1 | | 1/2003 | Dritschler et al. |
| 2003/0088579 | A1 | | 5/2003 | Brown et al. |
| 2003/0212668 | A1 | * | 11/2003 | Hinshaw et al. .................. 707/3 |
| 2003/0233391 | A1 | | 12/2003 | Crawford et al. |
| 2004/0003087 | A1 | | 1/2004 | Chambliss et al. |

(Continued)

OTHER PUBLICATIONS

Oracle, "Oracle9i Database Resource Manager", Technical Whitepaper, 2001, pp. 1-11.

*Primary Examiner* — Brittany N Allen
(74) *Attorney, Agent, or Firm* — John D. Cowart; Ramin Mahboubian

(57) ABSTRACT

A virtual regulator implemented to provide closed-loop system management (CLSM) functionality to a database system and without a need to substantially adapt a given CLSM technology to account for specific nuances and requirements of an operating system. For example, the regulator may be implemented with either or both of process model operating systems and thread model operating systems. Common examples of these include UNIX, LINUX, MP-RAS, MS WINDOWS or WINDOWS NT.

6 Claims, 2 Drawing Sheets

(56) References Cited

U.S. PATENT DOCUMENTS

| | | |
|---|---|---|
| 2004/0062106 A1 | 4/2004 | Ramesh et al. |
| 2004/0078105 A1 | 4/2004 | Moon et al. |
| 2004/0205110 A1* | 10/2004 | Hinshaw ................ 709/201 |
| 2004/0225631 A1 | 11/2004 | Elnaffar et al. |
| 2004/0230675 A1* | 11/2004 | Freimuth et al. ............ 709/223 |
| 2005/0010558 A1* | 1/2005 | Dettinger et al. ............. 707/3 |
| 2005/0066326 A1 | 3/2005 | Herbeck et al. |
| 2005/0114862 A1 | 5/2005 | Bisdikian et al. |
| 2005/0262183 A1 | 11/2005 | Colrain et al. |
| 2005/0289098 A1* | 12/2005 | Barsness et al. ............. 707/1 |
| 2006/0026179 A1 | 2/2006 | Brown et al. |

\* cited by examiner

VIRTUAL REGULATOR FOR A DATABASE SYSTEM

CROSS REFERENCE TO OTHER APPLICATIONS

This application claims priority under 35 U.S.C. §119(e) to the following co-pending and commonly-assigned patent application, which is incorporated herein by reference: Provisional Application Ser. No. 60/715,816, entitled "A VIRTUAL REGULATOR FOR A DATABASE SYSTEM," filed on Sep. 9, 2005.

This application incorporates by way of cross reference the subject matter disclosed in: U.S. Pat. No. 6,351,749, filed Sep. 30, 1999, entitled Multi-threading, multi-tasking architecture for a relational database management system, by Douglas P. Brown, Allen D. Diaz and Donald R. Pederson; and U.S. patent application Ser. No. 10/730,348, filed Dec. 8, 2003, entitled Administering the Workload of a Database System Using Feedback, by Douglas P. Brown, Anita Richards, Bhashyam Ramesh, Caroline M. Ballinger and Richard D. Glick, U.S. patent application Ser. No. 10/786,448, filed Feb. 25, 2004.

BACKGROUND

Any discussion of the prior art throughout the specification should in no way be considered as an admission that such prior art is widely known or forms part of common general knowledge in the field.

It is known to use a regulator in conjunction with a database system. Generally, the regulator provides one or more specific functionalities to the database system, such as closed loop system management.

In typical cases, a functionality designed for usage with a database system operating within a first operating system requires substantial modification to allow usage with a database system operating within a second operating system. Many functionalities are complicated, and as such are difficult to migrate between operating system requirements. Indeed, in some cases an operating system is specifically designed on the basis of a functionality that is being developed.

SUMMARY

It is an object of the present invention to overcome or ameliorate at least one of the disadvantages of the prior art, or to provide a useful alternative.

In accordance with a first aspect of the invention, there is provided a virtual regulator for a database system, the database system being operable within an operating system for executing one or more queries, the regulator including:
  an interface for receiving a query of the database system;
  a processor in communication with the interface and responsive to a protocol for:
    classifying the query to execute in accordance with a set of rules associated with a workload definition; and
    selectively releasing the query for execution under control of a priority scheduler facility; and
  a mask applicable to the priority scheduler facility for isolating from the virtual regulator functions of the database system that are dependant on the operating system.

In accordance with a further aspect of the invention, there is provided a method for managing a database system, the database system being operable within an operating system for executing one or more queries, the method including the steps of:
  receiving a query of the database system;
  being responsive to a protocol for:
    classifying the query to execute in accordance with a set of rules associated with a workload definition; and
    selectively releasing the query for execution under control of a priority scheduler facility; and
  applying a mask to the priority scheduler facility for isolating behind the priority scheduler facility functions of the database system that are dependant on the operating system.

BRIEF DESCRIPTION OF THE DRAWINGS

The benefits and advantages of the present invention will become apparent to those skilled in the art to which this invention relates from the subsequent description of exemplary embodiments and the appended claims, taken in conjunction with the accompanying drawings, in which:

DETAILED DESCRIPTION

Figure 1:
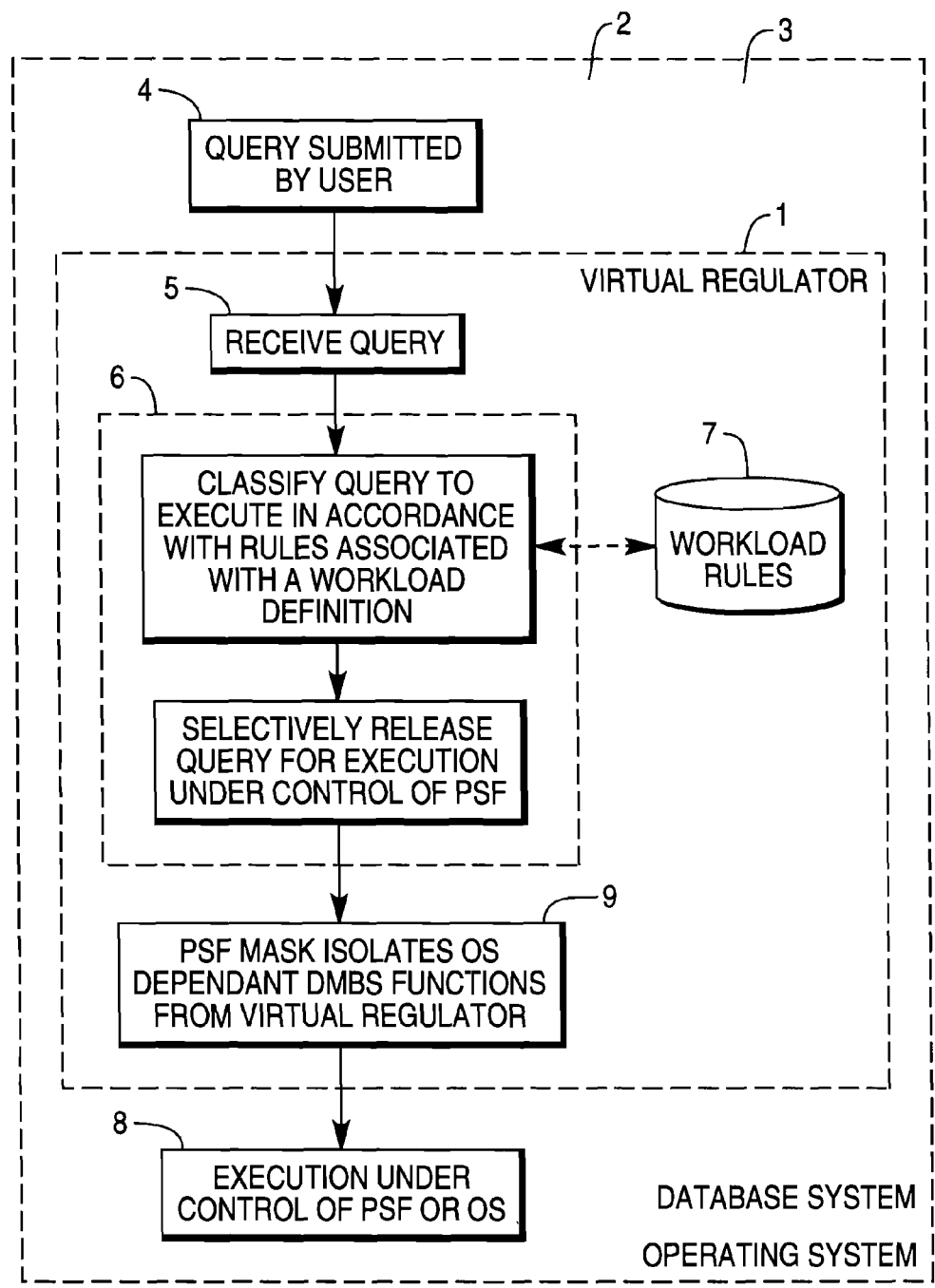
FIG. 1 is a schematic representation of a virtual regulator according to one embodiment of the invention.

Referring to the drawings, it will be appreciated that, in the different figures, corresponding features have been denoted by corresponding reference numerals.

Referring initially to FIG. 1, there is provided a virtual regulator 1 for a database system 2. Database system 2 is operable within an operating system 3 for executing one or more queries submitted at 4. Regulator 1 includes an interface 5 for receiving a query of database system 2. A processor 6 is in communication with interface 5 and responsive to a protocol 7 for classifying the query to execute in accordance with a set of rules associated with a workload definition. Processor 6 subsequently selectively releases the query for execution under control of a priority scheduler facility (PSF) 8. As mask 9 is applicable to PSF 8 for isolating from regulator 1 functions of database system 2 that are dependant on operating system 3.

It will be appreciated that, in practice, a plurality of queries are received by interface 4 and subsequently handled by regulator 1. Further, in practice there are a plurality of workload definitions, and each query belongs to a particular one of the workload definitions, as classified under protocol 7. This is dealt with in greater detail below.

Although regulator 1 is illustrated as subsisting within operating system 3, it will be appreciated that the virtual processor style architecture facilitates subsistence of regulator 1 outside of operating system 3. That is, regulator 1 is able to function as a stand-alone device.

Figure 2:
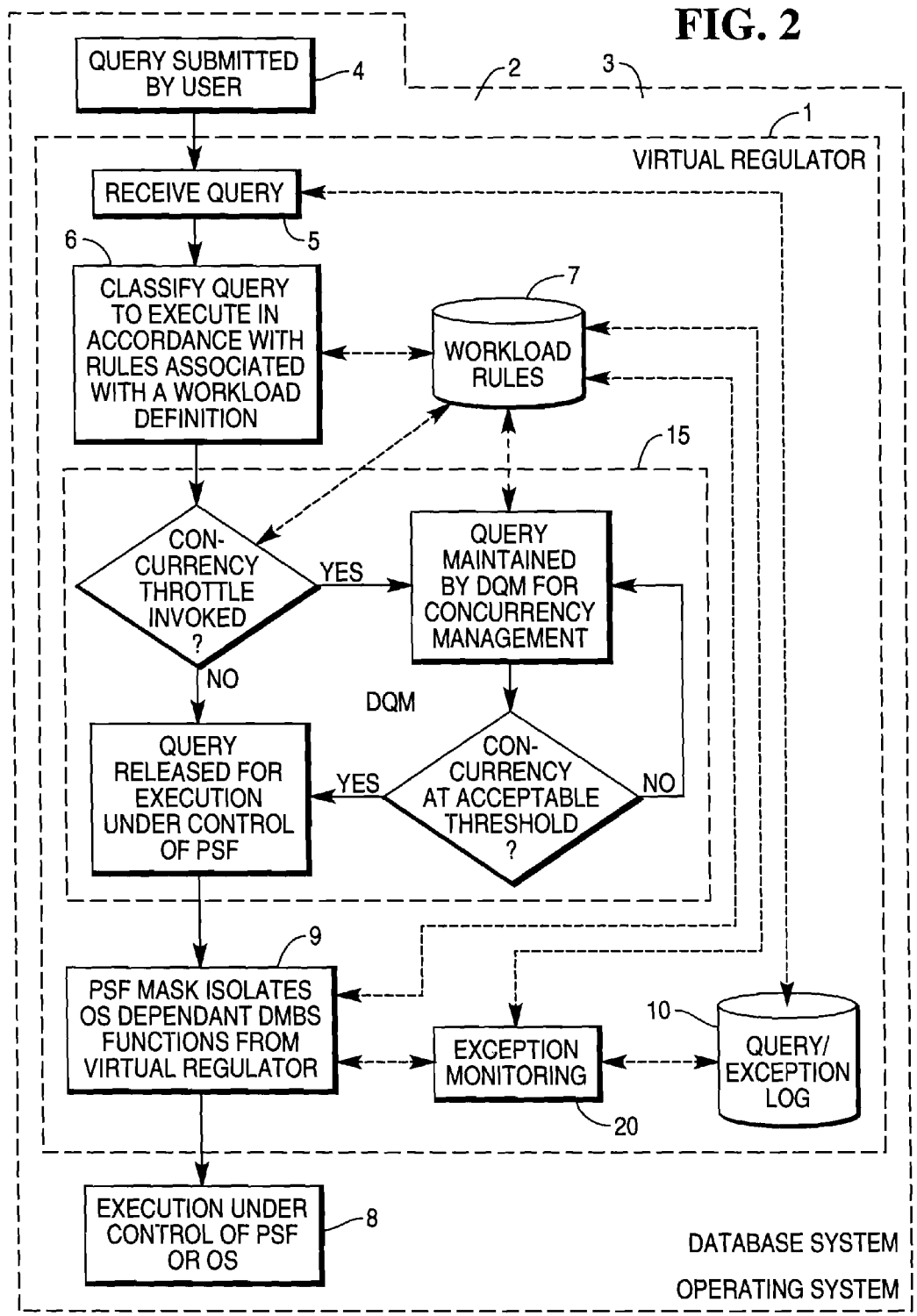
FIG. 2 a schematic a representation of a virtual regulator according to a further embodiment of the invention.

In the embodiment of FIG. 2, regulator 1 is implemented to provide closed-loop system management (CLSM) functionality to database system 2. This is achieved without a need to substantially adapt a given CLSM technology to account for specific nuances and requirements of operating system 3. For example, regulator 1 is implemented with either or both of process model operating systems and thread model operating systems. Common examples of these include UNIX, LINUX, MP-RAS, MS WINDOWS or WINDOWS NT. The adaptation to CLSM functionality is dealt with in greater detail below.

Operating system names used the present disclosure may be subject to trademarks, and are reproduced wherein for descriptive purposed only, and without authorization of their respective owners. No affiliation, authorization, or permission is to be inferred.

It will be appreciated that the term "operating system" is used an a generic sense, and is by no means limited to any particular operating systems specifically mentioned herein. Indeed, embodiments of the invention are applicable to generally any operating systems in which various database systems are operable. It will further be appreciated that the present disclosure should not be limited by reference to any particular database systems.

In other embodiments, the virtual regulator of FIG. 1 is extended to provide alternate functionalities to database system 2. It will be appreciated that these functionalities are embedded into regulator 1, and as such are isolated from specific nuances and requirements of operating system 3. As such, these functionalities are implementable across a range of database systems and operating systems without the need for substantial modification.

Generally speaking, a database system 2 operating within an operating system 3 includes a PSF such as PSF 8 to control queries that are released for execution. The PSF controls the allocation and consumption of resources available to database system 2. As such, PSF 8 is designed with particular reference to nuances and requirements of operating system 3. Mask 9 interfaces regulator 1 with PSF 8. In particular, it allows regulator 1 to monitor the activity of PSF 8, and translates commands provided by regulator 1 to PSF 8 into a form functionally operable with PSF 8. It will be appreciated that it is often necessary to develop a specific mask 9 for each unique PSF 8. On the basis that the high level functionality of mask 9 remains constant across a range of unique PSFs, those skilled in the art will understand the processes involved in developing individual interfaces between mask 9 and a given PSF 8.

In the present embodiment, Parallel Database Extensions (PDEs) are used to insulate the regulator from operating system. PDEs are a known communication protocol commonly implemented in Teradata databases. It is possible to set up one or more partitions within operating system 3, these partitions being accessible utilizing PDEs. These partitions are initialized to include one or more memory segments, including common memory segments. The use of PDEs insulates regulator 1 from the specifics of operating system 3 and provides the necessary techniques for components of regulator 1 to access common memory segments. This is the case in both process model operating systems and thread model operating systems.

Protocol 7 associates a plurality of classes of query with a respective plurality of workload definitions. In the present embodiment, a workload definition is made up of four distinct categories of workload rules, as set out below. These will be recognized as cornerstones of CLSM technology.

Classification criteria. These are the WHO, WHAT and WHERE characteristics of a workload definition. These conditions are connected using operators such as AND, OR, NOT IN, and the like. An incoming query is analyzed on the basis of its WHO, WHAT and WHERE characteristics, and classified to a workload definition in response.

Operating windows—also known as workload periods. These allow different rule sets to apply to a given workload definition at various times. For example, a particular workload definition is granted higher priority treatment inside of business hours. Classification rules for a workload definition are constant across all operating windows of the workload.

Execution rules—such as service level goals (SLGs). These define the processing expectations for queries belonging to the workload definition, and are used to as the basis of determining performance of a workload and in providing closed-loop feedback. For example, where a particular workload definition is not executing within its defined SLG, action is taken by a feedback mechanism to adjust one or more operational characteristics of the database. In the present embodiment, this particularly involves adjusting one or more workload rules in protocol 7. Each SLG defined provides success criteria—the performance goal. This is in terms of any one or more of query response time, anticipated arrival rate and query resource consumption. Further refinement of that goal defines its desired service level, for example 80% of queries complete in X seconds or less. An enforcement priority is defined for each SLG to provide regulator 1 with a priority order in the event that two or more SLGs cannot be met concurrently and must be inter-prioritized.

Exception thresholds—such as throttling limits. These define aspects such as the maximum number of queries of a particular workload definition that are to be processed concurrently. This is discussed in some detail below.

Once processor 6 receives a query from interface 5, processor 6 is responsive to the classification criteria in protocol 7 for classifying the query to the appropriate workload definition. That query is hence classified for execution in accordance with the set workload rules associated with that workload definition. That is, the operating windows, execution rules, and exception thresholds. Data indicative of the receipt and classification is communicated via PDE for storage in a log 10. In the present embodiment, log 10 is illustrated as being a query log and an exception log. It is noted that, in this sense, log 10 is used to schematically illustrate a variety of logs maintained within regulator 1. In some embodiments these are defined by a plurality of discrete logs, whilst in other embodiments they are grouped into a single log, as shown in FIG. 2. The important factor is that log 10 is accessible by components or regulator 1 using PDEs.

Protocol 7 includes a concurrency throttle as part of the rule set for each workload definition—an exception threshold. Processor 6 is responsive to the concurrency throttle for selectively either releasing the query for execution or passing the query to a dynamic query manager (DQM) 15. More precisely, if the concurrency throttle is exceeded—that is the maximum allowable number of queries of the relevant workload definition are already being executed under the control of PSF 8—the query is passed to DQM 15. Otherwise, the query is released for execution under the control of PSF 8.

DQM 15 is responsive to the concurrency throttle for selectively either releasing the query for execution or retaining the query. The specifics of how this occurs is dependent on the DQM used, however typically DQM 15 receives an indication each time a query competes execution.

Regulator 1 includes an exception monitor 20 for monitoring the execution of queries for compliance with exception conditions. As part of this, monitor 20 is responsive to the query receipt and classification data in log 10. Exception conditions are also recorded and maintained in log 10. Monitor 20 is therefore able to recognize a failure to meet one or more SLGs for a particular workload, in which case action is taken. For example, a PDE signal is provided indicative of a command to modify protocol 7, or more precisely to change one or more rules associated with a one or more workload definitions. In another example, a signal is provided to DQM 15 indicative of a command to withhold or release one or more queries. In some cases a signal is provided indicative of a command to alter PSF settings. The algorithms and logic associated with the actions taken by monitor 20 are beyond the scope of the present disclosure, but will be understood by those with a working knowledge of CLSM technology. In some cases action is taken as a result of manual user input.

Log 10 keeps track of system demand from a workload-centric perspective. The data held in log 10 is accessible to monitor the actual performance versus goals and to analyze workload trends. This provides for general workload understanding and facilitates identification of performance tuning opportunities.

Described below is a specific example of how regulator 1 is implemented according to one embodiment. In the example various exemplary process names are used. These, and other aspects of the example, are provided for the purpose of illustration only and should not be regarded as limiting in any sense.

In this example, regulator 1 processor 6 includes one or more dispatchers. The regulator accomplishes its objective by dynamically monitoring the workload definitions, which are predefined by an administrator. During startup, each dispatcher allocates a segment to hold all CLSM Query Data structures. This segment is given an identifier (SEGID) and the SEGID is saved in the global partition of the dispatcher. This segment stays associated with the dispatcher global partition for the life of dispatcher—that is, it is never discarded. The global partition is accessed utilizing Parallel Database Extensions (PDEs), which insulates regulator 1 from the specifics of operating system 3 and provides the necessary techniques for accessing common memory segments on both a process model operating system and a thread model operating system.

Also during startup a single control task called DISWQM is spawned. DISWQM is a single threaded process whose purpose is to enforce workload concurrency throttles based on rules in protocol 7. This will be recognized as substantially the functionality of DQM 15. A number of API queries exist that are processed by the task DISWQM. These commands control the enable/disable of workload management within database 2 as well as providing an interface specifically to monitor the queue of delayed queries. When a CLSM enable instruction is entered via an API query, the DISWQM process launches an internal process called TWMDBTSK. The TWMDBTSK task processes the rules as described below.

The TWMDBTSK process reads workload rules and priority scheduling identifiers as defined in protocol 7. It then uses a mask 9 to define appropriate settings in PSF 8. An array of entries containing each workload definition identifier and its associated exception and logging options is built. It is attached to global memory segments called DISGLOBAL and is used by exception monitoring and logging.

The workload definitions are then sent to the DISWQM process that creates a TDWM GDO and writes this GDO to disk. The TDWM GDO is a file that contains a list of currently active CLSM rules. DISWQM then broadcasts a READ RULES GDO message to processor 6 indicating that the TDWM GDO has been updated. This signals each dispatcher to read the GDO and begin using these rules for workload management. When the Read TDWM GDO message is received, the current GDO is read into a newly allocated segment whose SEGID is saved in the dispatcher global partition. Each dispatcher task switches to this segment as a new query is received. The dispatcher global partition maintains the SEGID for the currently active CLSM rules segment.

When the TDWM GDO is received there will be a pause in processing as each dispatcher classifies each active query to an appropriate workload definition. An internal 'nicing' interface is used to migrate any active query to its new priority.

The DISWQM process is also responsible for monitoring all time periods defined in the workload rules for each workload definition. If new weights are associated with these time periods, the DISWQM process is responsible for using mask 9 to modify these weights in PSF 8.

When CLSM is enabled, each logon and query submitted to database 2 is validated against the rules in protocol 7. All object and access validation checking is done by using a CLSM rules cache maintained within each dispatcher, referred to as a DISWORKT process. Each DISWORKT process tests for the CLSM rules SEGID value as each query is processed. Each DISWORKT also maintains a local variable containing the SEGID it is currently using. If the SEGID in the global partition is different from the last SEGID it was using—for example due to a rules update—it issues a SEG-DISCARD command on the previous SEGID and then issues a SEGACCESS on the new segment. Any access or object violation restriction immediately causes the query to be aborted.

Global Semaphores (GSM) are used in an effort to distribute the DISWQM workload to the dispatchers for performance reasons. GSMs are created evenly across all nodes in the system for load leveling. A Conditional Add function is used on the GSM used for counting running queries. The add function only succeeds if the resultant value is less than or equal to a throttle value supplied with the GSM operation. If the Conditional Add succeeds, the query is below the defined throttle limit and allowed to run. If the conditional add fails due to the resultant value being over the defined throttle limit then the query is sent to DISWQM to be delayed. This GSM usage allows the submit/delay decision to be made within DISWORKT and reduces the messaging to and from the DISWQM process and keeps control local to each dispatcher.

Prior to sending the READ TDWMGDO message, the DISWQM process allocates a GSM for each workload definition in protocol 7. The allocation of these GSMs uses a PDE interface that allows a GSM be distributed across the nodes in database system 2. The GSM IDs returned from this interface are saved in the TDWM GDO. All GSMs are allocated during the DBS startup and initialized to a value of zero. One GSM is used for counting queries submitted to the DBS and another GSM is used for counting queries actually running within the DBS.

Given that GSM IDs are known to each DISWORKT, each DISWORKT independently decides whether or not to allow a query to be released for processing under the control of PSF 8. This decision is facilitated by performing a conditional increment on the GSM related with running queries associated with the workload definition to which a query is classified. This classification is done as the query enters DISSSTEP, a component of the dispatcher that analyzes the individual steps that make up a query. If the conditional GSM increment succeeds then it is within the defined limits for that workload definition and the query can be released. Otherwise, DISWQM holds the query until the GSM count changes suitably.

When a query completes, the corresponding GSM is decremented. If the returned value is greater than the current throttle value for a workload definition, then concurrency throttles are already satisfied and no further action is required. A resultant value less than the current throttle limit where there are more submitted queries than the throttle limit indicates there is pending work held by the DISWQM process and an existing "SQL COMPLETE" message is sent to the DISWQM process so that one or more held queries for the associated workload definition are submitted.

It will be appreciated that the above disclosure provides a method and system for implementing CLSM in a database system. At a broader level, a virtual regulator is disclosed. Although the present invention has been described with particular reference to certain preferred embodiments thereof, variations and modifications of the present invention can be effected within the spirit and scope of the following claims.

What is claimed is:

1. A method for managing a database system with a regulator component, the database system being operable within an operating system for executing one or more queries, the operating system being selected from multiple types of operating systems, and the method comprising:
receiving a query of the database system;
being responsive to a protocol configured to:
classify the query to execute in accordance with a set of rules associated with a workload definition that defines one or more execution release rules for releasing the query before or after the release of one or more other queries of the database system; and
selectively releasing the query, in accordance with the classifying of the query, for execution under control of a priority scheduler facility, where the priority scheduler facility is unique to the operating system within which the database system operates and where the regulator component is operable across the multiple types of operating system; and
applying a mask to the priority scheduler facility for isolating functions associated with the regulator component that are dependent on the operating system of the priority scheduler facility to allow communication between the regulator component and the priority scheduler facility; and
wherein the mask allows the regulator component to monitor the activity of the priority scheduler facility and translates commands provided by the regulator component to the priority scheduler facility into a form functionally operable with the priority scheduler facility and each unique priority scheduler facility requires a specific mask.

2. A non-transitory computer readable storage medium storing at least computer-executable instruction for managing workloads using a regulator across a range of database system that are operable within a range of operating systems, the operating systems each being selected from multiple types of operating systems, wherein the computer-executable instructions when executed by a computing system:
receiving a query of the range of database system; and
being responsive to a protocol configured to:
classify the query to execute in accordance with a set of rules associated with a workload definition that defines one or more execution release rules for releasing the query before or after the release of one or more other queries of the database system; and
selectively releasing the query for execution under control of a priority scheduler facility in accordance with the classifying of the query, where the priority scheduler facility is unique to one of the operating systems, and where the regulator is operable across the multiple types of operating systems; and
apply a mask to the priority scheduler facility for isolating functions associated with the regulator that are dependent on the operating system of the priority scheduler facility to allow communication between the regulator and the priority scheduler facility; and
wherein the mask allows the regulator component to monitor the activity of the priority scheduler facility and translates commands provided by the regulator component to the priority scheduler facility into a form functionally operable with the priority scheduler facility and each unique priority scheduler facility requires a specific mask.

3. The non-transitory computer readable storage medium of claim 2, wherein Parallel Database Extensions are used to insulate the regulator from operating systems.

4. The non-transitory computer readable storage medium of claim 2, wherein the operating system is a process model operating system.

5. The non-transitory computer readable storage medium of claim 2, wherein the operating system is a thread model operating system.

6. An apparatus that includes one or more physical processors configured to manage a database system with a regulator component, the database system being operable within an operating system for executing one or more queries, wherein the one or more processors are further configured to:
receive a query of the database system;
being responsive to a protocol configured to:
classify the query to execute in accordance with a set of rules associated with a workload definition that defines one or more execution release rules for releasing the query before or after the release of one or more other queries of the database system; and
selectively release the query, in accordance with the classifying of the query, for execution under control of a priority scheduler facility, where the priority scheduler facility is unique to the operating system within which the database system operates, and
where the regulator component is operable across the multiple types of operating system; and
apply a mask to the priority scheduler facility for isolating functions associated with the regulator component that are dependent on the operating system of the priority scheduler facility to allow communication between the regulator component and the priority scheduler facility; and
wherein the mask allows the regulator component to monitor the activity of the priority scheduler facility and translates commands provided by the regulator component to the priority scheduler facility into a form functionally operable with the priority scheduler facility and each unique priority scheduler facility requires a specific mask.

* * * * *